US009742692B2

(12) United States Patent
Murthy et al.

(10) Patent No.: US 9,742,692 B2
(45) Date of Patent: Aug. 22, 2017

(54) ACQUIRING RESOURCE LEASE USING MULTIPLE LEASE SERVERS

(71) Applicant: Microsoft Technology Licensing, LLC, Redmond, WA (US)

(72) Inventors: Ashwin Murthy, Bellevue, WA (US); Parveen Kumar Patel, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 28 days.

(21) Appl. No.: 14/312,107

(22) Filed: Jun. 23, 2014

(65) Prior Publication Data

US 2015/0372946 A1    Dec. 24, 2015

(51) Int. Cl.
| G06F 15/173 | (2006.01) |
| H04L 12/911 | (2013.01) |
| H04L 29/08 | (2006.01) |
| G06F 9/52 | (2006.01) |

(52) U.S. Cl.
CPC ............ *H04L 47/827* (2013.01); *G06F 9/526* (2013.01); *H04L 67/10* (2013.01)

(58) Field of Classification Search
USPC ........................................ 709/203, 220, 226
See application file for complete search history.

(56) References Cited

U.S. PATENT DOCUMENTS

| 5,999,712 | A * | 12/1999 | Molin et al. ................. 709/220 |
| 6,401,120 | B1 * | 6/2002 | Gamache et al. ............ 709/226 |
| 6,862,613 | B1 * | 3/2005 | Kumar et al. ................. 709/220 |
| 7,194,543 | B2 * | 3/2007 | Robertson et al. ........... 709/226 |
| 7,219,128 | B2 | 5/2007 | Berkowitz et al. |
| 7,246,255 | B1 | 7/2007 | Heideman et al. |
| 7,774,469 | B2 * | 8/2010 | Massa et al. ................. 709/226 |
| 8,560,524 | B2 | 10/2013 | Kingsbury et al. |
| 8,688,666 | B1 | 4/2014 | Briggs et al. |
| 8,694,647 | B2 | 4/2014 | Bolosky et al. |
| 2002/0112008 | A1 * | 8/2002 | Christenson et al. ........ 709/206 |
| 2002/0188590 | A1 * | 12/2002 | Curran et al. .................... 707/1 |
| 2003/0093505 | A1 * | 5/2003 | Waldo et al. ................. 709/220 |

(Continued)

OTHER PUBLICATIONS

"Distributed locks with Redis (version May 19, 2014)", Published on: May 19, 2014 Avaialble at: https://github.com/antirez/redis-doc/blob/6117996f2cbef14b96dbc51ada1e157410a796b4/topics/distlock.md.

(Continued)

*Primary Examiner* — Michael Y Won
(74) *Attorney, Agent, or Firm* — Workman Nydegger (57) ABSTRACT

The obtaining of a lease on a resource in a circumstance in which multiple lease servers are capable of granting a lease to the resource. A computing entity attempts to obtain the lease on the resource by causing a lease request to be sent to each of at least most (and perhaps all) of the lease servers. In response, the computing entity receives one or more responses to the lease requests. If the computing entity receives grants of a lease from a majority of the lease servers that are capable of granting a lease to the resource, then it is determined that the computing entity acquired a lease on the resource. On the other hand, if the computing entity receives grants of a lease from less than a majority of the lease servers, it is determined that the computing entity failed to acquire the lease on the resource.

20 Claims, 4 Drawing Sheets

(56) References Cited

U.S. PATENT DOCUMENTS

| | | | |
|---|---|---|---|
| 2003/0144894 A1* | 7/2003 | Robertson et al. | 705/8 |
| 2007/0124342 A1* | 5/2007 | Yamamoto et al. | 707/202 |
| 2011/0145153 A1* | 6/2011 | Dawson et al. | 705/80 |
| 2013/0111261 A1* | 5/2013 | Dalton | 714/4.11 |
| 2013/0254775 A1 | 9/2013 | Michel et al. | |

OTHER PUBLICATIONS

Boichat, et al., "Asynchronous leasing", In Proceedings of the Seventh International Workshop on Object-Oriented Real-Time Dependable Systems, Aug. 7, 2002, 8 Pages.

Gray, et al., "Leases: An Efficient Fault-Tolerant Mechanism for Distributed File Cache Consistency", In Proceedings of the Twelfth ACM Symposium on Operating Systems Principles, vol. 23, No. 5, Nov. 1, 1989, pp. 202-210.

"International Search Report and Written Opinion Issued in PCT Application No. PCT/US2015/036627", Mailed Date: Sep. 28, 2016, 11 Pages.

"Second Written Opinion Issued in PCT Application No. PCT/US2015/036627", Mailed Date: Apr. 29, 2016, 7 Pages.

"International Preliminary Report on Patentability Issued in PCT Application No. PCT/US2015/036627", Mailed Date: Sep. 22, 2016, 8 Pages.

Chapter 22: Distributed Databases, Database System Concepts, 5th Ed., Silberschatz, Korth and Sudarshan, 91 pages, Aug. 22, 2005.

Burrows, Mike, Google Inc., The Chubby lock service for loosely-coupled distributed systems, OSDI'06: Seventh Symposium on Operating System Design and Implementation, Seattle, WA, Nov. 2006, 16 pages.

Knapp, Edgar, Deadlock Detection in Distributed Database, Department of Computer Sciences, University of Texas at Austin, Austin, Texas, 78712, ACM Computing Surveys, vol. 19, No. 4, Dec. 1987, 26 pages.

\* cited by examiner

ACQUIRING RESOURCE LEASE USING MULTIPLE LEASE SERVERS

BACKGROUND

Computing technology is becoming increasing distributed. Lock servers are often used to synchronize and coordinate state in a distributed system by providing distributed locks. One such application of distributed locking is for leader election in a distributed system. Typically, lock servers are themselves highly available services and replicate the lock state across various replicas. However, the various replicas of a lock server are co-located within the same datacenter or region. If that data center or region experiences temporary outage (and hence is unavailable) or if there is a network issue causing the DNS lookup of the lock service to fail, this can cause availability loss to all other dependent services that rely on that lock server it to serve locks or mandate leader election.

One conventional technology uses a majority protocol to establish locks. In that technology, there are a number of lock servers, each maintaining a copy of the resource. In order for a computing system to establish a lock to that resource, the computing system must obtain a lock from a majority of the lock servers. When the computing system is finished with the resource, the computing system then ideally releases all of the obtained locks on that resource.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the obtaining of a lease on a resource in a circumstance in which multiple lease servers are capable of granting a lease to the resource. A computing entity (such as an application, component, module, or the like) attempts to obtain the lease on the resource by causing a lease request to be sent to each of at least most (and perhaps all) of the lease servers. In response, the computing entity receives one or more responses to the lease requests.

If the computing entity receives grants of a lease from a majority of the lease servers that are capable of granting a lease to the resource, then it is determined that the computing entity acquired a lease on the resource. On the other hand, if the computing entity receives grants of a lease from less than a majority of the lease servers, it is determined that the computing entity failed to acquire the lease on the resource. In some embodiments, in the latter case, then the computing entity may relinquish the minority of obtained lease(s).

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein relate to the obtaining of a main lock on a resource in a circumstance in which multiple lease servers are capable of granting a lease to the resource. A computing entity (such as an application, component, module, or the like) attempts to obtain the main lease on the resource by causing a lease request to be sent to each of at least most (and perhaps all) of the lease servers. In response, the computing entity receives one or more responses to the lease requests. If the computing entity receives grants of a lease from a majority of the lease servers that are capable of granting a lease to the resource, then it is determined that the computing entity acquired a main lease on the resource. On the other hand, if the computing entity receives grants of a lease from less than a majority of the lease servers, it is determined that the computing entity failed to acquire the main lease on the resource. In some embodiments, in the latter case, then the computing entity may relinquish the minority of obtained lease(s). In this description, the term "lease" (when not modified by the term "main") is used in cases in which individual lease servers grant a lease to a resource. However, in accordance with the principles described herein, receiving a lease on a single lease is not itself sufficient for the computing system to act on any lease. In contrast, when a sufficient number of these leases are received, the computing system determines that it has a "main lease" on the resource, which allows the computing system to act upon the resource.

Some introductory discussion of a computing system will be described with respect to FIG. 1. Then, further embodiments will be described with respect to subsequent figures.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
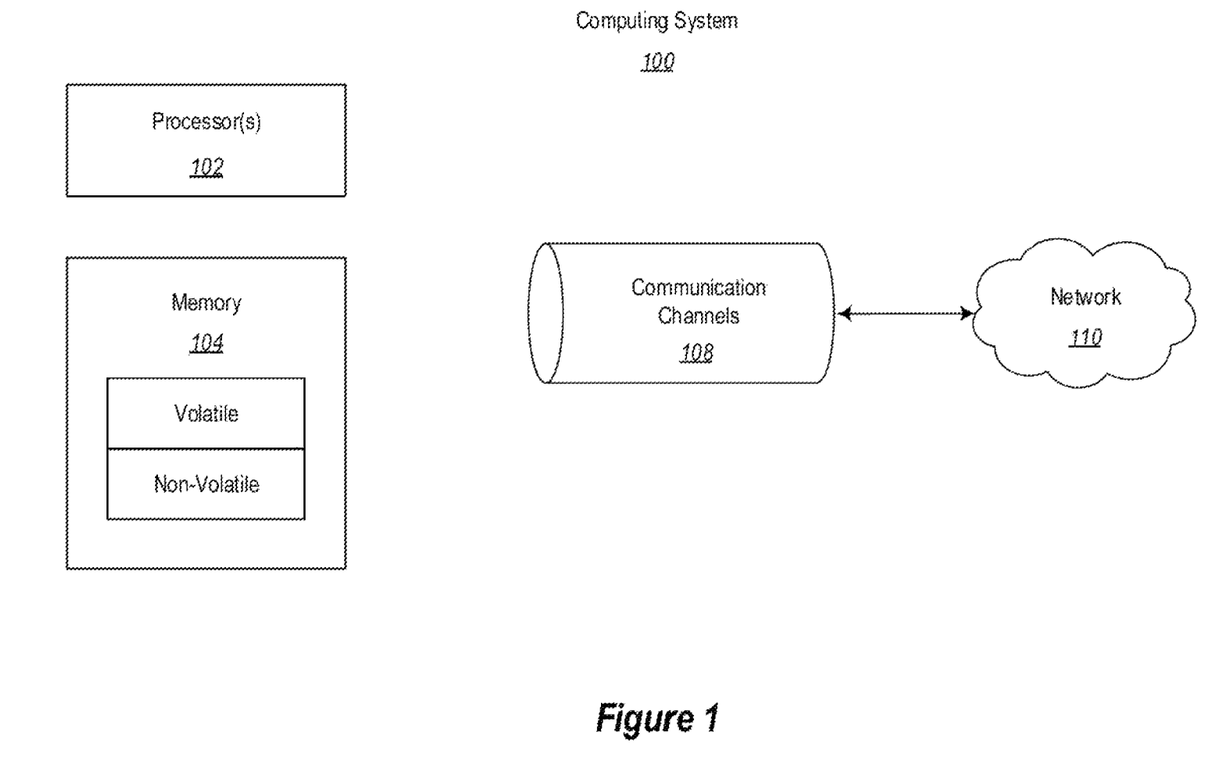
FIG. 1 illustrates an example computing system in which the principles described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
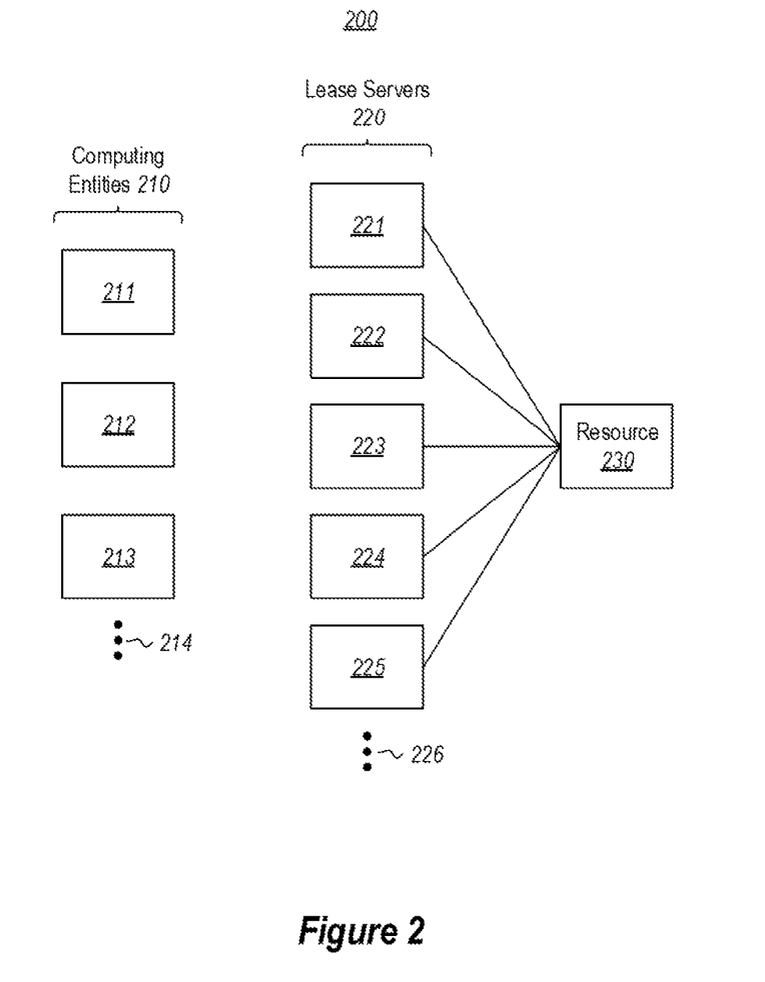
FIG. 2 illustrates an environment that includes a plurality of computing entities that may submit requests to the plurality of lease servers in order to use the accessed leases to obtain a main lease on a resource.

FIG. 2 illustrates an environment 200 that includes a plurality of computing entities 210 that may submit lease requests to the plurality of lease servers 220 in order to use the accessed leases on a resource to obtain a main lease on the resource. As an example, the resource may be a database, a table, an entry, a file, a permission, a role, or any other computing resource in which access control may be utilized.

A conventional lease typically permits the computing entity that has the lease to perform operations on the resource that are within the scope of the lease. Unlike a lock, a lease has an expiration time. The expiration time is typically initially set to be at a predetermined interval after the lease was obtained. Furthermore, prior to expiration time, the lease may be renewed to thereby postpone the expiration time. The expiration time of the lease may perhaps be postponed indefinitely if renewals are successfully performed at relatively frequent intervals. However, in accordance with the principles described herein, the computing system does not consider itself to have permission (i.e., a main lease) to perform operation on the resource until it receives a sufficient number of leases.

In this particular example, the plurality of computing entities 210 are illustrated as including three computing entities 211 through 213. However, the ellipses 214 represent that the broader principles described herein are applicable regardless of the number of computing entities 210. There may be as few as one computing entity that is ever to seek a main lease on the resource 230. However, the principles described herein are more useful when there are multiple computing entities that may seek a main lease on the resource 230 as leases are intended to prevent multiple computing entities from performing inconsistent actions on a resource. In some environments in which the resource 230 is to be publicly or widely available, there may be an enumerable number of potential computing entities that may seek a main lease on the resource 230.

Each of the computing entities may be any entity that is representable by a computing system, such as the computing system 100 of FIG. 1, and that is capable of accessing resources. For instance, the computing entity may be a process, a thread, a module, a component, an object, or the like capable of running on a computing system. The computing entity may further represent an entire computing system, such as the computing system 100 of FIG. 1.

In this particular example, there are five lease servers 221 through 225 illustrated. However, the ellipses 226 represent that the broader principles described herein are not limited to the number of lease servers 220 so long as there are multiple lease servers. Each of the lease servers 220 is capable of granting a lease to a particular resource 230. The lease servers 220 may each be structured and operate as described above for the computing system 100 of FIG. 1.

There may be any number of replicated copies of the resource 230. At one extreme, there may be a single copy of the resource 230. Alternatively, each of the lease servers 220 may have a replicated copy of the resource 230. The principles described herein apply regardless of the location of the lease servers 220. They may be located in a single location (e.g., a single data center), or they may be distributed in different data centers.

In this illustrated example, there are five lease servers that are capable of granting leases on the resource 230. However, the same set of lease servers may also be capable of granting leases on other resources as well. The principles described herein are not limited to obtaining a main lease on a single resource. Furthermore, different sets of lease servers may be used to grant leases on different resources. Thus, the principles described here are not limited to whether or not the same set of lease servers, or different sets of lease servers, are to be used when obtaining a main lease on different resources.

In this description, an example implementation will be described in which the main lease is an exclusive main lease. When a computing entity has an exclusive main lease (such as a write main lease), no other computing entity may have a similar type of exclusive main lease. Typically, exclusive leases are obtained when the computing entity is to edit the resource. In an editing environment, there cannot be two computing entities that concurrently edit the resource in a safe manner that ensures consistency.

However, there are other kinds of leases. There is, for example, a read lease. In many situations, it is perfectly acceptable to an entity that desires to read from a resource to read from a recent version of the resource that may have been subject to more recent editing. In that case, one computing entity may obtain a read lease even though another entity has a write lock. Alternatively, numerous computing entities may hold concurrent read leases on a resource. There are numerous other types of possible lease such as 1) write leases in which other read leases are prohibited, 2) write leases in which other read leases are conditionally restricted (e.g., to a number of readers, to particular readers, or other restrictions), and so forth.

In the description that follows, a computing entity obtains a main lease by inferring that it is safe to assume that the computing entity has the main lease based on multiple leases received from multiple lease servers. The type of main lease obtained will, however, depend on the type of lease requested. For instance, if a computing entity desires to read, but not edit, the resource 230, then the computing entity may request a read main lease from the lease servers. The lease servers 220 that receive the lease request make independent decisions about whether it is safe to grant the lease of the requested type on the requested resource. However, as mentioned above, the examples that follow will discuss an exclusive main lease as an example of the obtained main lease.

Figure 3:
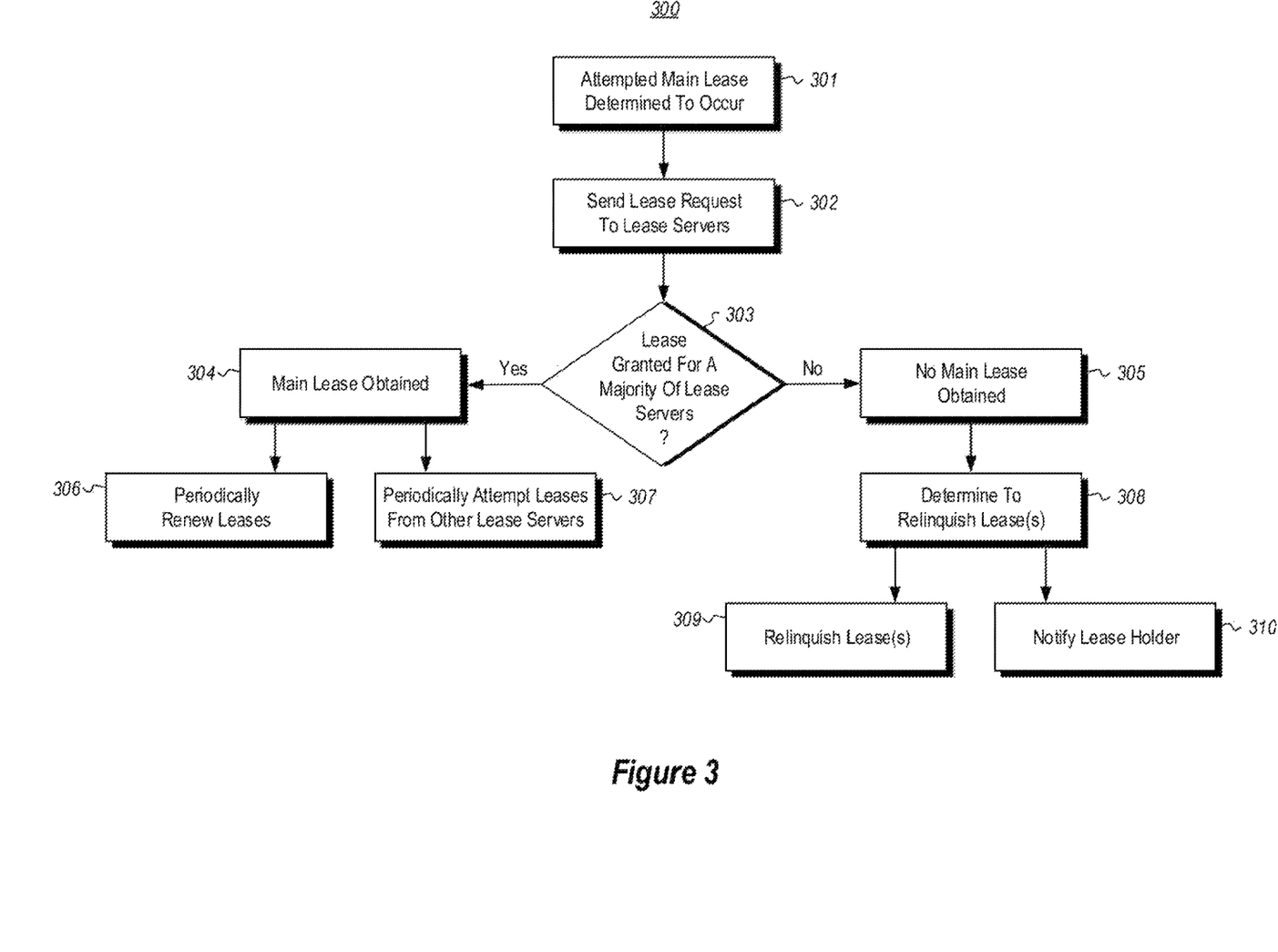
FIG. 3 illustrates a flowchart of a method for attempting to obtain a main lease to a resource.

FIG. 3 illustrates a flowchart of a method 300 for attempting to obtain a main lease to a resource. As the method 300 may be performed in the context of the environment 200 of FIG. 2, the method 300 will be described with frequent reference to the FIGS. 2 and 3.

The method 300 is initiated upon determining that an attempted to obtain a main lease for a resource is to be performed (act 301). For instance, in the context of the environment 200 of FIG. 2, suppose a specific example in which the computing entity 211 determines that an attempt is to be made to acquire a main lease on the resource 230.

In response to the determination (act 301) that a main lease is to be attempted on a resource, the computing entity requests (act 302) to obtain a corresponding lease on the resource to each of at least a majority (and perhaps all) of the lease servers that are capable of granting the requested lease to the resource. For instance, suppose that the computing entity 211 desires an exclusive main lease for edit access. The computing entity 211 would cause a request for the corresponding lease to be sent to each of a majority of the lease servers 220. For instance, in the case of there being five lease servers 220, the computing entity 211 would send lease requests to each of at least three, but perhaps four or five of the lease servers 220. In the specific example, suppose that the lease server sends the lease request to each of the four lease servers 221, 222, 223 and 224, but not to the lease server 225. For instance, perhaps the computing entity 211 is aware that the lease server 225 is down for maintenance.

Consequently, the computing entity may receive responses back from each of one or more of the lease servers. The computing entity may then determine whether or not it has successfully acquired the main lease based on the received responses. If, for example, the computing entity receives granted leases from at least a majority of the plurality of lease servers ("Yes" in decision block 303), then the computing entity may determine that the main lease is successfully obtained (act 304). On the other hand, if the computing entity does not receive granted leases from a majority of the lease servers ("No" in decision block 303), then the computing entity determines that the main lease is not successfully obtained (act 305).

For instance, in the specific example, recall that the computing entity 211 submitted lease requests to each of the four lease servers 221, 222, 223 and 224. Now suppose that the computing entity 211 is granted the requested lease by each of the four lease servers 221, 222, 223 and 224, or perhaps has been granted the requested lease by each of three lease servers 221, 222 and 223. In either case, the computing entity 211 determines that a main lease of the resource 230 is acquired.

This is a safe determination in the case of exclusive main leases (and correspondingly requested exclusive leases) because no more than one computing entity may successfully obtain a grant of concurrent leases on a resource from a majority of the lease servers that are capable of granted that lease. For instance, suppose that computing entity 212 also wanted an exclusive main lease on the resource 230 at the same time that computing entity 211 was requesting the exclusive main lease on the resource 230. If the majority of lease servers 220 have already granted an exclusive lease to the computing entity 211, then that majority of lease servers 220 will exercise logic to prevent an inconsistent exclusive lease from being granted to the computing entity 212. Thus, at most, the computing entity 212 will succeed in getting a grant of the lease from a minority of the lease servers 220, and thus will not be able to obtain the main lease. Thus, assuming that only those computing entities that abide by the majority rule process are able to obtain grants of leases, then it is a safe assumption that a main lease may be obtained upon receipt of a majority of the exclusive leases on a resource from a majority of the lease servers capable of granting an exclusive lease on that resource.

The computing entity that obtained the main lease will periodically attempt to renew each of the obtained leases (act 306). Whenever the lease is renewed from a majority of the lease servers capable of granting a lease on the resource, then the main lease remains in place, and will remain in place at least until the expiration interval of the latest lease obtained from the majority of lease servers (or until the main lease is explicitly relinquished).

For instance, suppose that a lease is good for 2.5 hours, and renewal is requested every hour. It is helpful for the periodicity of the attempting to renew the leases to be more frequent than the expiration interval of the lease, to improve the chance that a main lease can be held for longer periods despite a loss in performance of any given lease server.

In this example, suppose the computing entity 211 first acquires the leases from lease servers 221, 222 and 223 at midnight. That means that the computing entity 211 acquired the main lease at midnight. The main lease is guaranteed until 2:30 am unless relinquished prior to that time.

At 1:00 am, the computing entity 211 attempts to renew the leases from lease servers 221, 222 and 223 in accordance with act 306. In the case of receiving a renewal back from all of the lease servers 221, 222 and 223 (which is a majority of the five lease servers 220), then the main lease remains in place. Now, the main lease is guaranteed until 3:30 am unless relinquished prior to that time.

At 2:00 am, the computing entity 221 again attempts to renew the leases from lease servers 221, 222 and 223. Now, the computing entity 221 receives renewals back from only lease servers 221 and 222, which is only a minority of the lease servers 220. However, since it is not yet 3:30 am, the main lease remains in place, but the expiration of the mean lease remains at 3:30 am.

At 3:00 am, the computing entity 221 again attempts to renew the leases from lease servers 221, 222 and 223. If the computing entity 211 then receives renewals from all three lease servers 221, 222 and 223, then the main lease remains in place. The main lease is now guaranteed until 5:30 am unless relinquished prior to that time. On the other hand, at the 3:00 am renewal, if only two lease servers 221 and 222 were to grant lease renewal, then the main lease remains in place until 3:30 am, after which point the main lease can no longer be assumed as available to the computing entity 221.

To improve consistency in access to the main lease, and resiliency across failure of lease servers and communications with the same, the computing entity may also attempt (act 307) to obtain leases from those of the lease servers 220 that are not corresponding to the initially obtained leases. Let us examine the same example to see how improved resilience is obtained.

Again, suppose that a lease is good for 2.5 hours, and renewal is requested every hour. As in the prior example, suppose the computing entity 211 first acquires the leases from lease servers 221, 222 and 223 at midnight. Lease server 224 was not functioning at midnight, and the lease server 225 was down for maintenance. That means that the computing entity 211 acquired the main lease at midnight. The main lease is guaranteed until 2:30 am unless relinquished prior to that time.

At 1:00 am, the computing entity 211 attempts to renew the leases from lease servers 221, 222 and 223 in accordance with act 306. However, the computing entity 221 also attempts to obtain leases from lease servers 224 and 225. Lease server 225 is now completed maintenance, and the computing entity 211 does send a lease request to lease server 225 this time. Accordingly, in addition to the renewal of leases from the lease servers 221, 222 and 223, the computing entity 221 also receives a grant of the lease from the lease server 225. Nevertheless, lease server 224 does not respond as it is still not functioning. Thus, the computing entity 221 has received a grant of the lease from four of the five lease servers 220, a clear majority. Accordingly, the main lease is guaranteed until 3:30 am unless relinquished prior to that time.

At 2:00 am, the computing entity 221 again attempts to renew the leases from lease servers 221, 222, 223 and 225. Now, the computing entity 221 receives renewals back from lease servers 221, 222 and 225. As in the prior example, lease server 223 did not respond to the 2:00 am renewal request. However, three other lease servers (a majority) did respond. Accordingly, the main lease remains in place and will expire no earlier than 4:30 am unless relinquished before that time. Note that this is true despite lease server 224 remaining non-responsive at 2:00 am.

At 3:00 am, the computing entity 221 again attempts to renew the leases from lease servers 221, 222, 223 and 225 (act 306), and also attempts to obtain the main lease from lease server 224. Only the lease servers 221 and 222 grant the renewal. The downtime of lease server 223 is extended. Furthermore, the maintenance of the lease server 225 surfaced a problem resulting in it not responding. However, the computing entity receives a grant of the lease from the lease server 224. Accordingly, the main lease is guaranteed until 5:30 am unless relinquished prior to that time. Thus, despite transient problems with some of the lease servers, the computing entity was never even put in a position where the main lease could not be extended, and certainly was not put in position that the expiration time was approached. Instead, the expiration time simply rolled back without risking loss in the main lease.

In this example, the periodicity of the renewal of obtained leases was the same as the periodicity of the attempting to obtain leases from lease servers that had not yet granted a lease. In each case, the periodicity was one hour in the example. However, these periodicities may be different. Furthermore, the period need not be fixed. As an example, the period may become more frequent the longer that renewal has been unsuccessful in extending the expiration of the main lease.

Figure 4:
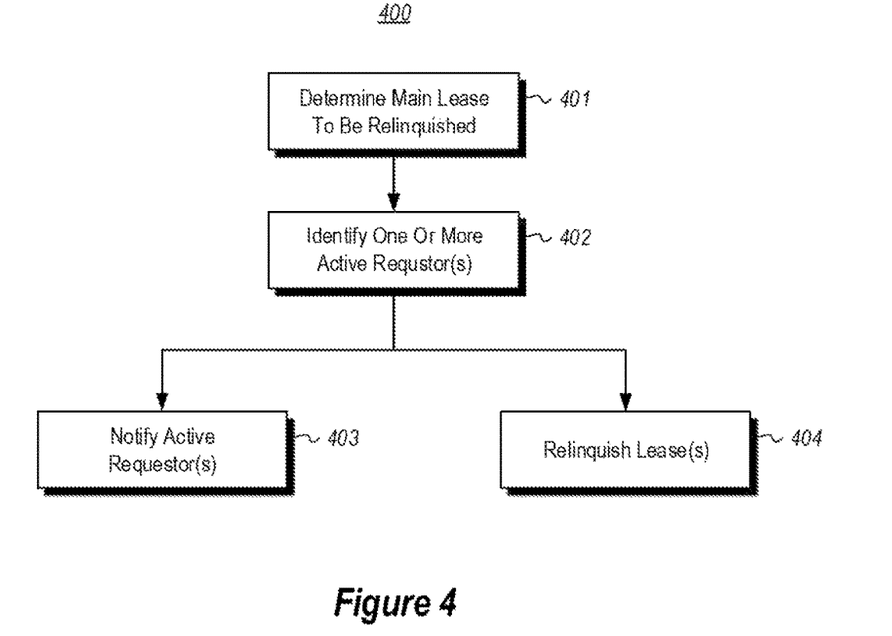
FIG. 4 illustrates a flowchart of a method for relinquishing the main lease, which applies when the computing entity is finished with the resource, and wants to relinquish the main lease so that the resource can be used by other entities.
Figure 5:
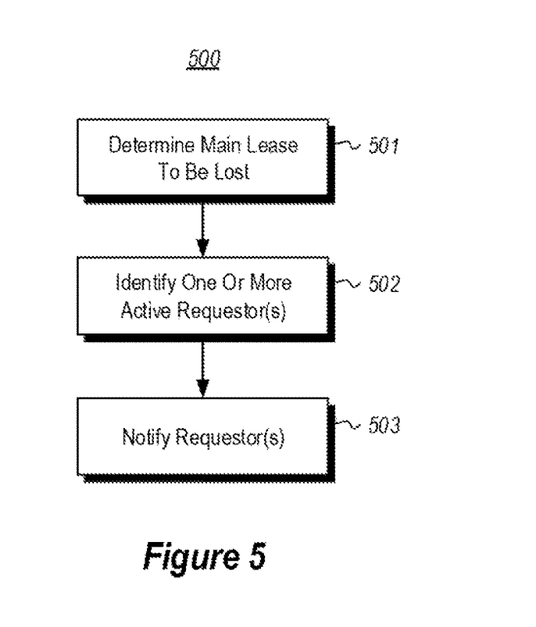
FIG. 5 illustrates a flowchart of a method for preparation of expiration of the main lease, which occurs when the computing entity has been unable to renew a lease, resulting in the expiration of the main lease drawing near.

At this point, we are still deferring description of the method after determining that no main lease has been obtained (after act 305 in FIG. 3). This description will address that after a discussion of FIG. 4 and FIG. 5. FIG. 4 illustrates a flowchart of a method 400 for relinquishing the main lease, which applies when the computing entity is finished with the resource, and wants to relinquish the main lease so that the resource can be used by other entities. FIG. 5 illustrates a flowchart of a method 500 for preparation of expiration of the main lease. This occurs when the computing entity has been unable to renew a lease, resulting in the expiration of the main lease drawing near.

In accordance with the method 400 of FIG. 4, the computing entity determines that the main lease is to be relinquished by relinquishing the leases on at least a majority of the plurality of lease servers (act 401). As an example, the computing entity may determine that all of the obtained leases associated with the resource are to be relinquished. In response, the computing entity identifies (act 402) that one or more other computing entities are also active requestors of a lease on the resource. As a result, the computing entity notifies at least one other of the lease requestor of the relinquishment (act 403), and communicates with the lease servers to relinquish the leases (act 404).

For instance, suppose that the resource 230 is in high demand by each of the computing entities 211, 212 and 213. Again, suppose that a lease is good for 2.5 hours, and renewal is requested every hour. As in the prior example, suppose the computing entity 211 first acquires the leases from lease servers 221, 222 and 223 at midnight. In this example, suppose the computing entity 211 was not able to obtain a grant on the lease from the lease server 224, because the lease server 224 granted the lease to the computing entity 212 in response to a lease request at 12:01 am. Further, suppose the computing entity 211 was not able to obtain a grant on the lease from the lease server 225, because the lease server 225 granted the lease to the computing entity 212 in response to a least request at 12:02 am. In this case, the computing entity 211 determines that it has the main lease in act 304 of FIG. 3, and the computing entities 212 and 223 each determine that they do not have the main lease in act 305.

Now suppose that the computing entity 211 really only needed the main lease for 5 minutes. At 12:05 am, the computing entity determines that the main lease is to be relinquished (act 401), determines that both computing entities 212 and 213 are active requestors of leases on the resource (act 402), sends at least one of the computing entities 212 or 213 a notification of the impending or recent relinquishment (act 403), and also relinquishes the leases (act 404) through communication with the appropriate lease servers. The computing entity 212 may then send a lease request shortly after the notification, and shortly after the relinquishment, thereby improving access to the resource, and efficiency of utilization of the resource 230. The computing entity 211 may apply policy in determining which of the computing entities 212 or 213 (or both) to send the notification to, whether one is to be notified after the other, and so forth.

FIG. 5 illustrates a flowchart of a method 500 for preparation of expiration of the main lease. This method occurs upon the computing entity detecting (act 501) that at least a majority of the leases of the lease server will expire or has expired. For instance, take the case of a prior example in which the main lease is set to expire at 3:30 am. Recall that the computing entity 211 initially acquired leases from lease servers 221, 222 and 223 at midnight, and was able to renew theses leases at 1:00 am, extending the expiration of the main lease to 3:30 am (absent a relinquishment prior to that time). The computing entity 211 was unable to renew the majority of leases at 2:00 am or at 3:00 am, and thus the computing entity 211 could plan that the main would not be available after 3:30 am.

After determining that at least a majority of the leases will or has expired (act 501), the computing entity identifies active requests of the lease (act 502), and notifies the active requestor of the availability of the lease (act 503). For instance, suppose at 3:30 am, the computing entity 211 knows that the computing entity 212 has been requesting leases on the resource 230. The computing entity 211 may then notify the computing entity 212 of the availability of leases on the resource. This again causes the computing entity 212 to request, and perhaps quickly acquire, the majority of leases and the main lease on the resource 230. Accordingly, efficiency of utilization of the resource is improved.

Up until now, the case of obtaining a majority of requested leases ("Yes" in decision block 303) has been described. Now, embodiments will be described in which less than a majority (i.e., a minority) of the leases are obtained. Of course, the computing entity determines that no main lease is obtained (act 305) in the case of receiving only a minority of cases. In this case, the computing entity may determine (act 308) that at least one (and potentially all) of the obtained minority of leases are to be relinquished due to failure to obtain the main lease. The computing entity then relinquishes the obtained minority of leases (act 309).

For instance, suppose again that the resource 230 is in high demand by each of the computing entities 211, 212 and 213. Again, suppose that a lease is good for 2.5 hours, and renewal is requested every hour. As in the prior example, suppose the computing entity 211 first acquires the leases from lease servers 221, 222 and 223 at midnight. In this example, suppose the computing entity 211 was not able to obtain a grant on the lease from the lease server 224, because the lease server 224 granted the lease to the computing entity 212 in response to a lease request at 12:01 am. Further, suppose the computing entity 211 was not able to obtain a grant on the lease from the lease server 225, because the lease server 225 granted the lease to the computing entity 213 in response to a least request at 12:02 am. In the case of FIG. 3, the computing entity 212 would relinquish the lease obtained from lease server 224 (act 308 when performed by computing entity 212). Likewise, the computing entity 213 would relinquish the lease obtained from lease server 225 (also act 308 when performed by computing entity 213). Accordingly, when the computing entity 211 tried to acquire the leases at 1:00 am (in act 307), the computing entity 211 would more likely be able to receive the granted lease from lease servers 214 and 215, and thereby more likely be able to take advantage of the intent of act 307 in improving resiliency of the obtained main lease to lease server failure.

As a further improvement, the computing entity may notify the main lease holder of the relinquishment (act 310). In the previous example, this would allow the computing entity 211, which holds the main lease, to become aware prior to 1:00 am that the lease may be newly available from the lease servers 224 and 225. Accordingly, the computing entity 211 may request the leases from lease servers 224 and 225 much earlier than the next scheduled time. This improves the chance that the main lease holder will not have to compete as strongly to obtain the majority of leases, once the main lease is obtained. This improves stability of the main lease, and again improves resilience of the main lease to unavailability of one or more lease servers.

Accordingly, the principles described herein provide a resilient and stable mechanism for acquiring a controlling lease on a resource that has multiple lease servers capable of granting leases on that resource.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product for a computing entity to obtain a main lease to access a computing resource, the computer program product comprising one or more computer-readable hardware storage devices having stored thereon computer-executable instructions which, when executed by one or more processors of a computing system, cause the computing system to perform:
    a computing entity seeking a main lease to access a computing resource, a main lease comprising a separate lease from each of a simple majority of a plurality of lease servers, each of the plurality of lease servers being independently capable of granting a lease to the resource, seeking a main lease comprising sending a request to obtain a lease on the computing resource to each of at least a majority of the plurality of lease servers, and wherein the main lease, comprising the separate leases from each of the simple majority of the plurality of lease servers, is required for the computing entity to act upon the resource;
    receiving an affirmative lease response from each of the one or more lease servers;
    determining whether the one or more affirmative lease responses constitutes a majority of the plurality of lease servers;
    when the one or more affirmative lease responses constitutes a majority of the plurality of lease servers, determining that a main lease, comprising lease from a majority of the lease servers, has been obtained on the resource; and
    upon determining that a main lease has been obtained, acting upon the resource within the scope of the main lease.

2. A computer program product in accordance with claim 1, wherein the request is sent to all of the plurality of lease servers.

3. A computer program product in accordance with claim 1, further configured to cause the computing system to determine that the main lease is to be relinquished, or has been relinquished, by relinquishing the leases on at least a majority of the plurality of lease servers.

4. A computer program product in accordance with claim 3, further configured to cause the computing system to notify at least one other lease requestor of the relinquishment.

5. A computer program product in accordance with claim 1, further configured to cause the computing system to detect that at least a majority of the leases of the plurality of lease servers will imminently expire or has expired.

6. A computer program product in accordance with claim 5, further configured to cause the computing system to notify at least one other lease requestor of the expiration.

7. A computer program product in accordance with claim 1, further configured to cause the computing system to periodically attempt renewal of each of the obtained leases.

8. A computer program product in accordance with claim 1, the obtained leases being only from a majority of the plurality of lease servers, further configured to cause the computing system to periodically attempt to obtain leases from those of the plurality of lease servers that are not corresponding to the initially obtained leases.

9. A computer program product in accordance with claim 8, wherein the periodicity of the attempt to obtain leases is more frequent than a minimum time used in the case in which a main lease has not been obtained and consequent relinquishment designated as occurring after that minimum time.

10. The computer program product in accordance with claim 1, further configured to cause the computing system to, prior to sending, determine that a main lease is to be attempted for a resource.

11. A method for a computing entity to obtain a main lease to access a computing resource, the method performed by executing computer executable instructions on at least one processor at a computing system, the method comprising:
    seeking a main lease to access a computing resource, a main lease comprising a separate lease from each of a simple majority of a plurality of lease servers, each of the plurality of lease servers being independently capable of granting a lease to the resource, seeking a main lease comprising sending a request to obtain a lease on the computing resource to each of at least a majority of the plurality of lease servers, and wherein the main lease, comprising the separate leases from each of the simple majority of the plurality of lease servers, is required for the computing entity to act upon the resource;
    receiving an affirmative lease response from each of the one or more lease servers;
    determining whether the one or more affirmative lease responses constitutes a majority of the plurality of lease servers;
    when the one or more affirmative lease responses constitutes a majority of the plurality of lease servers, determining that a main lease, comprising lease from a majority of the lease servers, has been obtained on the resource; and
    upon determining that a main lease has been obtained, acting upon the resource within the scope of the main lease.

12. A method in accordance with claim 11, further comprising:
    determining that the main lease is to be relinquished, or has been relinquished, by relinquishing the leases on at least a majority of the plurality of lease servers; and
    notifying at least one other lease requestor of the relinquishment.

13. A method in accordance with claim 11, further comprising:
    detecting that at least a majority of the leases of the plurality of lease servers will soon expire or has expired; and
    notifying at least one other lease requestor of the expiration.

14. A method in accordance with claim 11, the obtained leases being only from a majority of the plurality of lease servers, the method further comprising:

periodically attempting to obtain leases from those of the plurality of lease servers that are not corresponding to the initially obtained leases, wherein the periodicity of the attempting to obtain leases is more frequent than a minimum time used in the case in which a main lease has not been obtained and consequent relinquishment designated as occurring after that minimum time.

15. A method for a computing entity to request and relinquish leases to access a computing resource, the method performed by executing computer executable instructions on at least one processor at a computing system, the method comprising:

seeking a main lease to access a computing resource, a main lease comprising a separate lease from each of a simple majority of a plurality of lease servers, each of the plurality of lease servers being independently capable of granting a lease to the resource, seeking a main lease comprising sending a request to obtain a lease on the computing resource to each of at least a majority of the plurality of lease servers, and wherein the main lease, comprising the separate leases from each of the simple majority of the plurality of lease servers, is required for the computing entity to act upon the resource;

receiving an affirmative lease response from each of one or more lease servers;

determining whether the one or more affirmative lease responses constitutes a majority of the plurality of lease servers;

when the one or more affirmative lease responses is less than a majority of the plurality of lease servers, determining that a main lease, which requires a lease from a majority of the lease servers, has not been obtained on the resource; and upon determining that a main lease has not been obtained on the resource, determining that at least one of the one or more obtained leases is to be relinquished.

16. A method in accordance with claim 15, further comprising:

notifying at least one other lease requestor of the relinquishment.

17. A method in accordance with claim 15, the at least one of the one or more obtained leases being all of the minority of obtained leases.

18. A method in accordance with claim 15, further comprising:

relinquishing by releasing the at least one of the one or more obtained leases.

19. A method in accordance with claim 18, further comprising:

determining a time for the act of relinquishing, the time being at least a minimum time.

20. A method in accordance with claim 19, wherein the time is randomly selected.

* * * * *